Jan. 17, 1939.  M. LOW  2,144,588
LINK MAT
Filed May 27, 1937
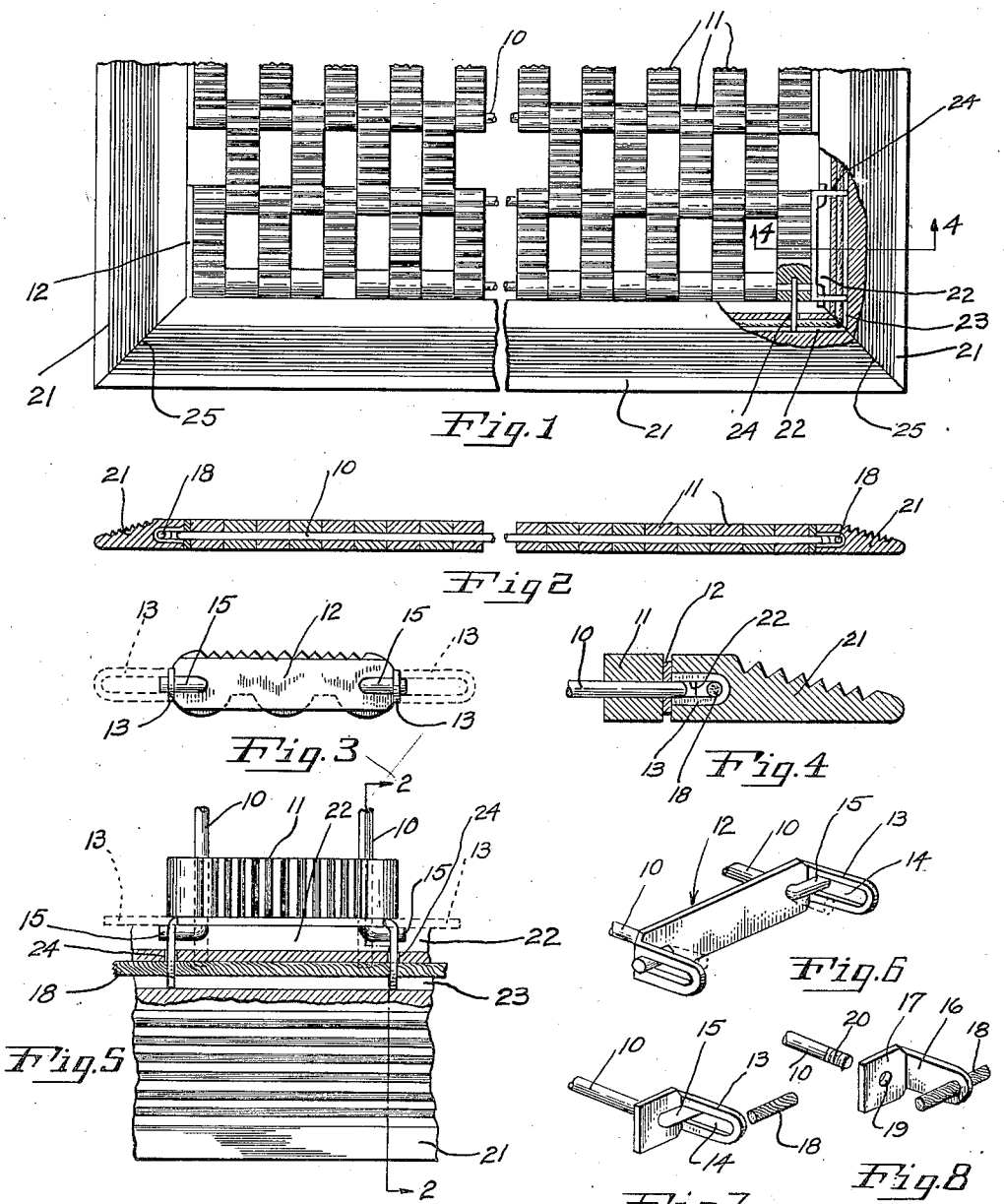
Inventor
Marshall Low Patented Jan. 17, 1939

2,144,588

UNITED STATES PATENT OFFICE 2,144,588

LINK MAT

Marshall Low, Washington, D. C., assignor to Wingfoot Corporation, Wilmington, Del., a corporation of Delaware Application May 27, 1937, Serial No. 145,075

8 Claims. (Cl. 20—78)

The present invention relates to mats and, particularly to link mats of the type in which a series of links are pivotally connected in staggered relation to a series of rods with a border strip or nosing secured to the rods.

A particular object of this invention is to provide a novel means for securing the nosing to the pivot rods or body of the mat.

Another object of this invention is to provide novel means for holding the links in place on the pivot rods and for preventing rotation of the pivot rods.

More particularly, an object of this invention is to provide a simple means for holding the links on the rods and for preventing turning of the rods by utilizing a portion of the link-retaining means as will be more fully set forth in the specification.

In the drawing,

Fig. 1 is a plan view, with parts broken away, of a mat embodying my invention;

Fig. 2 is a cross-section taken along the line 2—2 of Fig. 5;

Fig. 3 is an end elevation of the means for holding the links on the rods and for securing the rods against turning movement;

Fig. 4 is a cross-section taken substantially along the line 4—4 of Fig. 1;

Fig. 5 is an enlarged plan view with parts broken away showing the means for attaching the nosing strip and for retaining the links in place;

Fig. 6 is a perspective view of the means for holding the links in place and for preventing turning movement of the rods; and Figs. 7 and 8 are perspective views showing modifications of my invention.

The mat comprises a plurality of rods 10 on which are pivoted the links 11 in staggered relationship as clearly illustrated in Fig. 1. The rods 10 are usually straight in order to permit the assembly of the links thereon. After the links have been assembled on the rods, a retainer indicated generally at 12 having perforations to receive the rods 10 is slipped over the ends of the rods. The retainer 12 is formed with the upturned ears 13 slotted as at 14. When the retainer is in place on the rods against the links assembled on the rods, the ends 15 of the rods are bent over from the dotted-line position shown in Fig. 6 to the full-line position shown therein, whereby the ends 15 of the rods lie within the slots 13 and the rods are thereby prevented from rotating. Each rod may be provided with a plate and a loop portion as shown in Fig. 7 or a single plate with two ears may be provided, as in Fig. 6, the latter form being preferable in that it is more rigid and simplifies the production of these retainers as well as facilitates assemblage thereof.

If desired, the form shown in Fig. 8 may be used in which the ear 16 on the retainer 17 is perforated to receive a retaining cable 18 and in which the retainer base has a threaded opening 19 to receive the threaded end 20 of the pivot rod 11. For example, one end of the rod can be threaded as shown in Fig. 8 and threaded into a retainer as shown in this figure. The links may then be assembled on the rod or rods and then the opposite ends of the rods may be connected as shown in Fig. 6 or, if desired, both ends of the rods can be connected by the same type of connector, using any of the forms shown in Figs. 6, 7 or 8.

In forming the retainer 12, the same is made first as a plate with the ears extended as shown by dotted lines in Figs. 3 and 5. These plates may be left in this flat condition until assembled on the rods, then after the ends of the rods are bent over as at 15 the ears 13 may be bent up into the retaining position as indicated by full lines in Figs. 3, 4 and 5. Previously it has been customary to turn the bent ends toward each other and hold them from turning by a separate tubular member or like means.

The nosing 21 has a tapered upper surface so as to prevent stumbling on the mat as one moves his feet onto the mat and the inner edge of the nosing has a substantially vertical face on which there is provided a longitudinal groove 22, which groove embraces and conceals the inturned ends 15 of the rods 10 when the mat is assembled. The nosing is provided with a longitudinal opening 23 best illustrated in Figs. 1 and 5, which opening lies parallel to the groove 22. The wall between the groove and the opening is perforated as at 24 to receive the ears 13, which ears project into said perforations. A cable, such as 18, is threaded through the opening 23 and the perforations 14 in the ears to prevent withdrawal of the ears from the perforations 24 and to hold the nosing closely against the edges of the assembled links and retainers therefor, in the manner clearly illustrated in Fig. 1. The ends of the cable are preferably anchored in place by vulcanization between the beveled ends 25 of the side and end nosings when the latter are being vulcanized together, as set forth in the patent to Russon 2,077,901, or may be secured in any other suitable manner. Rods or equivalent means may also be employed in place of cables.

Obviously, various changes can be made in the embodiments shown in the drawing without departing from the spirit of this invention and, therefore, I do not wish to be limited except as hereinafter set forth in the claims hereunto appended.

Having thus fully described my invention, what I claim and desire to secure by Letters Patent of the United States is:

1. In a link mat, the combination with a plurality of pivot rods, links mounted on said rods in pivotal relation thereto, a nosing strip along at least one edge of said assembled links and rods, and means for connecting said rods to said nosing, comprising a retainer having a base mounted on at least one end of one of said rods and also having a portion extending outwardly from the edge of said assembled links and rods at substantially right angles to said base, said portion having a perforation extending laterally therethrough to receive a retaining member on said nosing.

2. In a link mat, the combination with a plurality of pivot rods, links mounted on said rods in pivotal relation thereto, a nosing strip along at least one edge of said assembled links and rods, and means for connecting said rods to said nosing, comprising a retainer having a base mounted on at least one end of one of said rods and also having a portion extending outwardly from the edge of said assembled links and rods at substantially right angles to said base, said portion having a perforation extending laterally therefrom to receive a retaining member on said nosing, said perforation in said extending portion being a slot and said end of said rod being bent substantially at right angles to the rod to extend into said opening whereby to prevent rotation of said retainer relative to said rod.

3. A link mat comprising pivot rods, links mounted on said rods, a retainer having perforations to receive at least two of said rods and having portions extending outwardly away from said links to act as a connecting means between said pivot rods and the nosing, openings in said portions, and laterally bent ends on said rods lying within said openings, whereby rotation of said rods relative to said retainer is prevented.

4. A retainer for retaining links in assembled relation and for holding the pivot rods against angular movement, comprising a base portion and angularly extending ears slotted to receive the bent ends of the pivot rods, the base portion having perforations to receive the pivot rods.

5. A retainer for retaining links in assembled relation and for holding the pivot rods against angular movement, comprising a base portion, said base portion having an angularly extending ear with a slot formed therein to receive the angularly bent end of a pivot rod, the base portion having a perforation to receive the body of the pivot rod.

6. A retainer for retaining links in assembled relation and for holding the pivot rods against angular movement, comprising a base portion having an angularly extending ear with a perforation to receive a retaining member and a threaded opening to receive the threaded end of a pivot rod.

7. A mat comprising a plurality of rods with links pivotally mounted on said rods, a nosing at least on one edge of said assembled links and rods, and means for connecting said rods to said nosing, comprising a substantially rigid retainer having a base mounted on at least one of said rods, an ear on said base extending outwardly at an angle to said base, a longitudinal opening in said nosing substantially parallel to the inner edge thereof, and a transverse recess communicating with the inner edge of said nosing and said longitudinal opening for receiving said ear, said ear having a perforation therethrough for receiving a retaining member and a retaining member extending through said perforation and opening, said perforation being sufficiently large to receive the bent end of one of said rods upon which said retainer is mounted, and one of said rods having a laterally bent end arranged in said perforation to prevent rotation of said rod.

8. A retainer and connector for link mats comprising a base portion having perforations to receive rods of said mat and angularly extending ears slotted to receive bent ends of said rods and for receiving a retainer member when connecting a nosing to the assembled links and rods.

MARSHALL LOW.